United States Patent [19]

Nomura

[11] Patent Number: 5,439,736
[45] Date of Patent: Aug. 8, 1995

[54] GAS PLASMA POLYMERIZED PERMSELECTIVE MEMBRANE

[75] Inventor: Hiroshi Nomura, Shorewood, Minn.

[73] Assignee: NeoMecs Incorporated, St. Louis Park, Minn.

[21] Appl. No.: 184,643

[22] Filed: Jan. 21, 1994

[51] Int. Cl.$^6$ .................. B32B 27/32; B01D 53/22
[52] U.S. Cl. .................. 428/308.4; 210/490; 427/489; 427/491; 427/495; 428/313.9; 428/314.2; 428/315.7; 428/315.9; 428/319.9; 428/447; 428/451
[58] Field of Search .................. 55/16, 158; 210/490; 427/489, 491, 495; 428/308.4, 313.9, 314.2, 315.7, 315.9, 318.8, 319.9, 447, 451

[56] References Cited

U.S. PATENT DOCUMENTS

| | | | |
|---|---|---|---|
| 4,410,338 | 10/1983 | Yamamoto et al. | 55/158 |
| 4,483,901 | 11/1984 | Okita et al. | 428/315.5 |
| 4,594,079 | 6/1986 | Yamamoto et al. | 55/158 |
| 4,696,686 | 9/1987 | Usami et al. | 55/158 |
| 4,824,444 | 4/1989 | Nomura | 55/16 |

OTHER PUBLICATIONS

Yamamoto et al., Plasma Polymerized Membranes and Gas Permeability I., J. Appl. Polymer Sci., 29, pp. 2981–2987 (1984).
Sakata et al., Plasma Polymerized Membranes and Gas Permeability II., J. Applied Polymer Sci., 31, pp. 1999–2006 (1986).
Kramer et al., Low Temperature Plasma for the Preparation of Separation Membranes, J. Membrane Science, 46, pp. 1–28 (1989).
Inagaki et al. "Preparation of Siloxane-Like Films by Glow Discharge Polymerization", J. Appl. Polyer Sci., 29 (1984) pp. 3595–3605.
Inagaki et al., "Plasma Polymerization Organosilicon Compounds", J. Appl. Polymer Sci., 30 (1985) 3385–3395.

*Primary Examiner*—D. S. Nakarani
*Attorney, Agent, or Firm*—Robert J. Petersen

[57] ABSTRACT

Plasma polymerization of a fully alkylated disiloxane is greatly enhanced by the addition of oxygen to the plasma feed gases. Deposition rate of polysiloxane polymerizate upon substrates is increased, and the deposits are nontacky. Composite permselective membranes made by deposition of plasma-polymerized polysiloxanes in the presence of oxygen are useful for applications such as gas separations. Composite hollow fiber membranes of polysiloxane polymerizate on porous polypropylene exhibit oxygen/nitrogen permselectivities greater than 2.3 combined with increased oxygen permeability.

26 Claims, 3 Drawing Sheets

GAS PLASMA POLYMERIZED PERMSELECTIVE MEMBRANE

FIELD OF THE INVENTION

This invention relates to membranes made by gas plasma polymerization. More specifically, this invention relates to composite membranes for gas separations and their method of formation from plasma polymerization of disiloxanes.

BACKGROUND OF THE INVENTION

It has long been a goal of membrane research to prepare membranes capable of economically separating oxygen from nitrogen, where both are contained in air. Potential applications of such membranes are many, including for example oxygen-enriched air for internal combustion engines, oxygen-enriched air for medical use, and generation of oxygen-free nitrogen for inerting the atmosphere above flammable fuels. Especially sought attributes of membranes are high oxygen selectivity combined with high oxygen permeation rate. Polydimethylsiloxanes, also known as silicones, are known to be selectively permeable to oxygen versus nitrogen, with a selectivity ratio of about 2. The polydimethylsiloxanes also show higher permeabilities to gases in general than almost all other materials. This characteristic has made them of special interest in oxygen enrichment applications. However, the poor physical strength characteristics of siloxane polymers in general and polymethylsiloxanes in particular result in the need to employ rather thick films of the polymers. Gas throughput rates are consequently low.

One method of overcoming this drawback has been to form thin, crosslinked films upon microporous substrates. An attractive approach to achieve this is by use of gas plasmas. Plasma polymerization has the ability to deposit coatings that are uniform, pinhole-free, highly adherent, and ultrathin, i.e., less than 2 micrometers in thickness. Plasma polymerization via gas plasmas has been used to prepare thin coatings on the surfaces of substrates, particularly microporous substrates, as a means of preparing semipermeable membranes with useful properties. This has been commonly achieved using "low temperature" or "cold" plasmas, which are generated at reduced gas pressures under glow discharge conditions. Radiofrequency (RF) generating electrodes are typically used to generate low temperature glow discharges.

The preparation of coatings from plasma polymerization of siloxane monomers has been known for some time. In the book "Plasma Polymerization" by H. Yasuda (Academic Press, 1985), data on plasma polymers from hexamethyl disiloxane and tetramethyl disiloxane dating back to 1971 are cited. U.S. Pat. Nos. 4,410,338 and 4,594,079 disclose the preparation of gas separating membranes wherein a layer of hexamethyl disiloxane plasma polymerizate is formed by glow discharge methods. U.S. Pat. No. 4,696,686 discloses oxygen separating membranes prepared from plasma deposition of a hexamethyl disiloxane polymerizate modified with fluorine-containing moieties on a porous polypropylene substrate. U.S. Pat. No. 5,002,652 discloses the deposition of an oxygen-permeable polysiloxane coating from a hexamethyl disiloxane gas plasma onto an electrode to form a sensor. In these disclosures, plasma reaction times were routinely reported to be in the range of 30 to 40 minutes. Mention is omitted in these disclosures regarding the difficulty of obtaining high molecular weight polymeric compositions from hexamethyl disiloxane in short reaction times, and in satisfactorily bridging pores in the surface of porous substrates in short reaction times.

It is in fact difficult to obtain suitable coatings for gas separations in a short plasma treatment of 1 to 5 minutes, or less. According to Table 6.13 of page 109 of the book cited above, a polymer deposition rate from a continuous discharge plasma of hexamethyl disiloxane has been observed to be $0.223 \times 10^{-8}$ g/cm$^2$− hour. This rate is approximately equivalent to a thickness deposition rate of about 4 angstroms per second. This rate is relatively slow, such that build-up of a contiguous film that bridges over pores in a porous substrate is problematic. Consequently, long plasma exposure times on the order of 30 minutes are required to deposit a film of sufficient thickness and contiguity to fully cover pores in a porous substrate such as microporous polypropylene sheet or hollow fiber. Only when all surface pores of a substrate have been bridged with a coating of sufficient thickness to withstand transmembrane operating pressures, can membranes made thereby exhibit good permselectivity toward gases. Unfortunately, this approach, utilizing long plasma polymerizate exposure times, results in thick, dense polymerizate deposits characterized by lower than desired gas fluxes through intact membranes. A faster rate of polymerizate deposition would be a highly desirable trait, one that is not met via the disiloxane plasma polymerization methods disclosed above.

In addition to the difficulty of obtaining a sufficiently rapid deposition rate of plasma polymer, one is also faced with differences in the form of the porous substrates to be coated, and difficulties arising therefrom. In particular, it is relatively easy to plasma coat a flat sheet of a film fixed in position and facing a gas plasma containing a disiloxane. It is more difficult to coat a hollow fiber substrate located in a stationary position, such as described in U.S. Pat. No. 4,410,338, because deposition is not typically uniform in all three dimensions in a gas plasma. Thus, a hollow fiber substrate may have regions of thick deposition and thin deposition adjacent to one another, differing only in the arc of the surface and its distance from an electrode surface. Furthermore, a commercially attractive coating operation must be able to handle a moving length of substrate, as in a continuous coating operation. Gas plasmas have the effect of thermally heating the substrate being coated. If the thermal heating is too intense, the substrate will undergo deformation in handling. For flat sheet substrates, sheet thickness and reinforcing fabric backings can be generally modified so as to resist substrate deformation, as the sheet is pulled through a plasma reaction zone. On the other hand, for porous hollow fiber substrates, such as made of porous polypropylene, thermal heating and potential substrate deformation during pulling become critical factors that severely limit the length of exposure that can be tolerated.

It is indeed next to impossible to adequately move a porous polypropylene fiber of the type used in Example 20 of U.S. Pat. No. 4,410,338 through a plasma treatment of the type disclosed because of thermal heating and fiber deformation. The results described in Example 20 of the patent cited immediately above were obtained on nonmoving fibers supported on a fixed support frame. The difficulty in obtaining uniformity and depth of coating in this hollow fiber example were evident in that the oxygen versus nitrogen selectivity of the polypropylene hollow fiber was 2.3, i.e., no better than the lowest observed selectivity value observed for flat sheet examples coated with a like composition under the same plasma polymerization conditions. Thus, the need for a faster rate of polymerizate deposition, unmet by the above-mentioned disiloxane plasma polymerization methods, is crucial to the ability to rapidly coat a hollow fiber in a time period wherein the fiber is not softened or caused to distort by input of too much thermal energy by the plasma itself.

In addition to the need for a higher polymerizate deposition rate, plasma polymerizate deposited from a hexamethyl disiloxane gas plasma is marked by tacky or blocking (i.e., self-sticking) surface characteristics. This behavior indicates the presence of excessive amounts of low molecular weight components. Fully alkylated disiloxanes such as hexamethyl disiloxane do not very readily polymerize to high molecular weight polymers, even by plasma polymerization processes. This is particularly noticeable at short plasma polymerization exposure times of 5 minutes or less, where the polymerizate deposits are tacky or blocky. If the polymerization is continued for much longer times (viz. 30 to 40 minutes) to generate polymerizate deposits that are handleable, such long plasma polymerization exposure times have the effect of lowering gas permeabilities of resulting composite semipermeable membranes by reason of the deposition of thicker, denser polymerizate coatings. Tackiness of a coating deposited on microporous hollow fiber substrates engender a host of handling difficulties, in that the coated fibers, for example, will stick to one another. Not the least of such handling difficulties is the disruption of ultrathin plasma coatings when fibers are pulled apart or moved relative to each other, causing formation of leaks. Another need exists therefore to improve the plasma polymerization of fully alkylated disiloxanes such that deposited polymerizate coatings are dry, i.e., not tacky or self-adhering.

U.S. Pat. No. 4,824,444 discloses the preparation of gas separation membranes with improved selectivity from tetramethyl disiloxane and its tetraalkyl analogs. This monomer group is characterized by having a hydrogen atom bonded to each silicon atom in the monomer. The hydrogen-silicon bond is considerably weaker than a alkyl-silicon bond, such that tetramethyl disiloxane and its tetraalkyl analogs polymerize readily by gas plasma techniques. Residence times of a porous substrate in a zone of tetramethyl disiloxane gas plasma were reported as being on the order of 19 seconds; yet suitable gas separating barrier layers were deposited. Unfortunately, this type of monomer is inordinately expensive relative to hexamethyl disiloxane. The high monomer expense severely negates its economic viability in the preparation of gas separation membranes.

In summary, therefore, a need remains in the area of plasma-deposited polysiloxane polymerizates for a method of rapidly generating such deposits using an inexpensive disiloxane monomer such as hexamethyl disiloxane in a manner not requiring excessively long plasma exposure times. In addition to this need for a greatly enhanced polymerizate deposition rate, a need also exists for a method of achieving high molecular weight polymerizate polymers from fully alkylated disiloxanes that do not have tacky or self-adhering surface characteristics, so that resulting coated articles can be properly and reasonably handled.

SUMMARY OF THE INVENTION

A method of polymerizing a fully alkylated disiloxane in a gas plasma has now been discovered whereby high molecular weight, nontacky polysiloxane polymerizate deposits can be produced on porous substrates at considerably increased polymerizate deposition rates, whereby requisite plasma exposure times are greatly shortened. This method utilizes a plasma formed from a fully alkylated disiloxane monomer such as hexamethyl disiloxane, the invention residing in the co-addition of oxygen or a gaseous mixture containing oxygen to the plasma gases. It has been axiomatic in plasma polymerizations to conduct those polymerizations in plasma vacuum apparatus as free of leaks as possible. Those skilled in the art of plasma polymerizations customarily seek to exclude air from their plasma reactors. But it has now been accidentally found that the controlled addition of oxygen, such as by introduction of air, to a plasma of hexamethyl disiloxane, rather than being detrimental to the plasma polymerization process, is actually surprisingly beneficial. This surprising finding simultaneously achieves a solution to both the need for enhanced polysiloxane polymerizate deposition rates and the need for deposition of dry, nontacky polymerizates from inexpensive disiloxane monomers such as hexamethyl disiloxane.

Thus, a gas plasma containing a fully alkylated disiloxane and oxygen has now been found to produce, in a considerably shortened plasma exposure time, high molecular weight, dry, polysiloxane polymerizate deposits on substrates. When the substrates are microporous polymeric hollow fibers, this method results in composite membranes having unexpectedly improved properties for gas separations. These improvements include higher selectivities toward oxygen versus nitrogen, higher gas fluxes through the membranes, and higher operating efficiencies in making such membranes. The invention resides, therefore, in the method of using oxygen as a co-reactant with a fully alkylated disiloxane in a gas plasma, and in products made by this method, especially products having utility for gas permselective separations.

DESCRIPTION OF BEST EMBODIMENT

Figure 1:
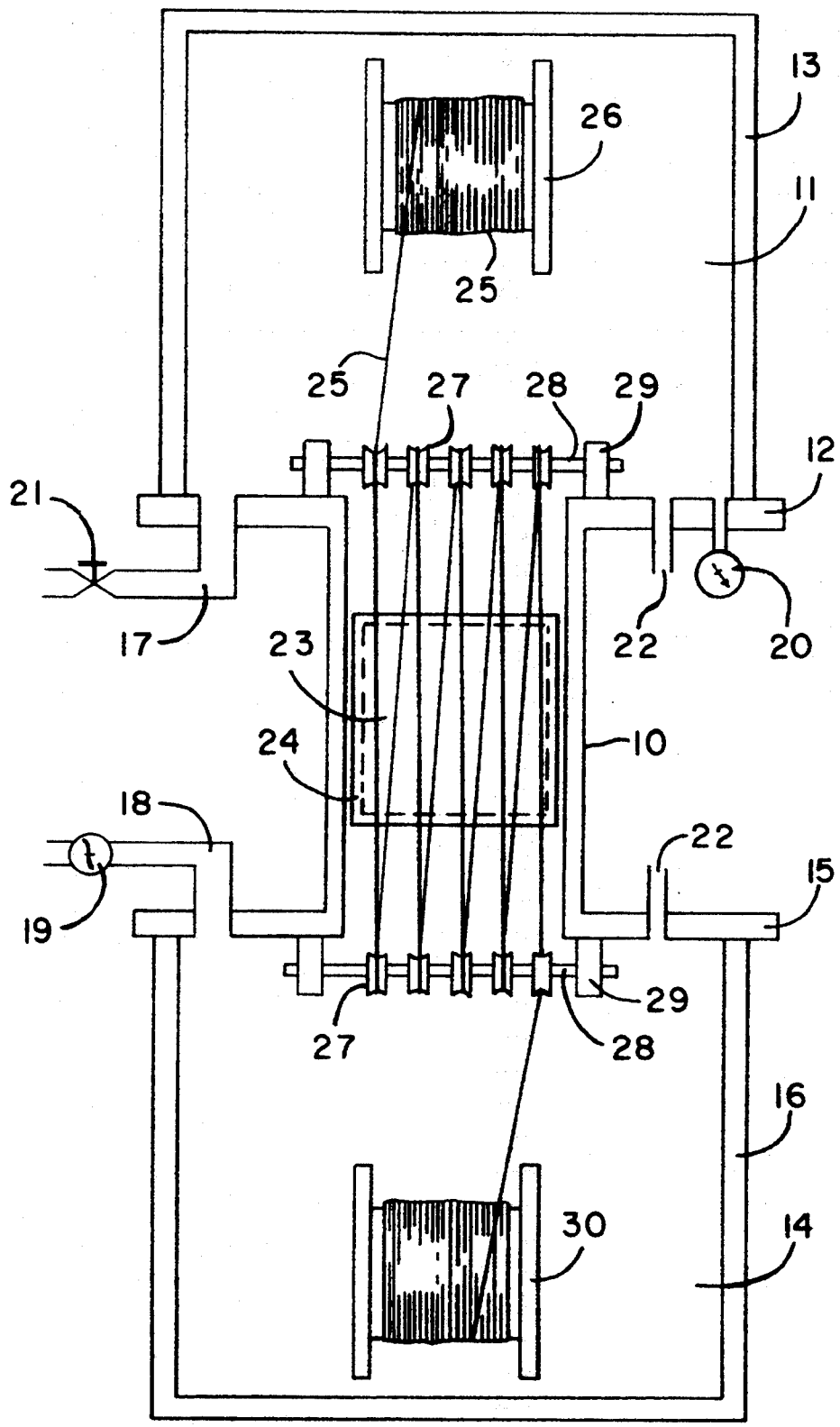
FIG. 1 is a schematic view of an apparatus whereby gas plasma treatment of a hollow fiber substrate may be accomplished.

The permselective membrane of the invention and the method of its preparation are described herein below in its preferred embodiment, with the understanding that the present disclosure is to be considered exemplary of the basics of the invention. The scope of the invention is to be measured by the appended claims and their equivalents. The permselective membrane of the invention is a composite membrane, having an ultrathin barrier layer deposited upon a substrate. The ultrathin barrier layer possesses the ability to discriminate between potential permeants. The substrate supplies strength and other physical handling characteristics not normally expressed by the ultrathin barrier layer but commonly needed for purposes of utility. The permselective barrier layer contains as an essential component a plasma polymerizate deposited from a gas plasma, the plasma polymerizate being formed from a fully alkylated disiloxane activated into a polymerizable state in a gas plasma in the presence of oxygen as an adjuvant to the gas plasma. An essential characteristic of the permselective membrane by virtue of the plasma-deposited barrier layer is its ability to selectively permeate oxygen at a higher rate than nitrogen.

The gas plasma is formed by glow discharge through a blend of gases at low pressure. Two essential components of the gas blend are the fully alkylated disiloxane and oxygen. The fully alkylated disiloxane has a chemical formula represented by $R_1R_2R_3Si-O-SiR_1R_2R_3$, where $R_1$, $R_2$, and $R_3$ are individually either methyl or ethyl groups. Hexamethyl disiloxane is the simplest example of a fully alkylated disiloxane, wherein all R groups of the above formula are methyl groups. In terms of low cost and ease of use, hexamethyl disiloxane is a preferred disiloxane for the plasma polymerization process of this invention. Oxygen, which is the other essential gaseous component, may be added to the gaseous blend either as the pure gas or as a mixture with other gases, or otherwise generated in the plasma zone. Air, being a naturally occurring mixture of nitrogen with oxygen, is a particularly advantageous source of oxygen. Air will be, in most cases, the least expensive source of oxygen. Further, the diluent nature of the nitrogen in air allows for greater measure of control of the addition rate of oxygen to a plasma reactor, as compared to the addition of pure oxygen. The presence of nitrogen does not appear to significantly impede or enhance the effectiveness of the oxygen in promoting plasma polymerization of the disiloxane. By itself, nitrogen in the absence of oxygen is found to negatively affect the plasma polymerization of hexamethyl disiloxane in that the resulting polymerizate is softer and more tacky than the polymerizate formed in the absence of nitrogen or oxygen. Other nonpolymerizable gases may be present with the hexamethyl disiloxane and oxygen, such as for example argon. Polymerizable gases, such as for example olefins, may be present in the gas plasma as well, so long as the salutary effect of oxygen on disiloxane plasma polymerization is not lost, and so long as the permselectivity of the polysiloxane polymerizate in the resulting polymerizate barrier layer is not significantly degraded.

The pressure of the gases in the plasma polymerization process may be varied within the range of 0.01 to 2 Torr. A preferred range of operating pressure is 0.05 to 1 Torr. Particularly preferred is an operating pressure of about 0.05 to 0.2 Torr. The partial pressure of the disiloxane in a gaseous blend being fed to the gas plasma is preferably in the range of 0.01 to 1.5 Torr, more preferably in the range of 0.01 to 0.5 Torr. The ratio of oxygen partial pressure to the disiloxane partial pressure in the gaseous blend feed may be varied from 0.1 to 2.0, more preferably from 0.2 to 1.0. Suitable upper and lower limits of the operable range of oxygen concentration will generally depend upon two factors. First, too low of an oxygen concentration may be expected to result in an inefficient deposition rate of the polysiloxane polymerizate upon substrates. Second, too high of an oxygen concentration may tend to result in unacceptable oxidative damage of substrate materials, particularly when such materials are composed of oxidizable polymers such as polyolefins. An optimal gaseous blend of oxygen with a fully alkylated disiloxane with or without diluent gases may vary somewhat, depending upon the specific design of a gas plasma design, choice of discharge power source, substrate choice, and final property of permselectivity sought for the coated substrate. Techniques for determining generally optimal oxygen content in the gas plasma feed gases would be familiar to one skilled in the art of plasma polymerizations. For the system used during the discovery of this invention, and its usage in preparing composite membranes with gas permselectivity by a continuous process of coating microporous hollow fiber substrates, a gas plasma operating on a feed gas content of approximately 25 mTorr of disiloxane, approximately 15 mTorr of oxygen, and approximately 35 mTorr of nitrogen has been found to deposit polysiloxane polymerizates with attractive combinations of permeability and selectivity towards gases. The presence of the oxygen in the plasma polymerization of the fully alkylated disiloxane results in two unanticipated and extremely favorable outcomes. First, the deposition rate of the plasma polymerizate is greatly increased. The increase in deposition rate can be at least as high as about 240%. The observable degree of increase will depend, of course, on the parameters of the process, as well as upon the sampling point in a plasma zone. This increase in deposition rate is extremely advantageous in that the necessary exposure time of a substrate to the gas plasma, in order to deposit a contiguous film, can be considerably shortened. The shortened exposure time results in less thermal injury to the substrate. Whereas 30 minutes or more appeared to be needed to deposit permselective coatings from hexamethyl disiloxane out of a gas plasma not having oxygen purposely added, only 1 to 5 minutes of exposure time is needed for substrate coverage by plasma polymerizate when hexamethyl disiloxane is plasma polymerized in the presence of oxygen. Depending upon the shape of the substrate, the nature and size of pores in the substrate surface, and the position of the substrate relative to the gas plasma, required time of exposure to the gas plasma may be even less than one minute. In the case of a microporous hollow fiber substrate, the greatly reduced exposure time greatly improves the ability to continuously process-coat moving fibers in that they can be pulled through the plasma reaction zone without being deformed or functionally destroyed in the process.

Second, the high deposition rate results in rapid bridging of plasma polymerizate coatings over pores on the substrate surface. As a consequence, high permselectivity can be attained at lesser thicknesses of plasma-deposited polymerizates. Lesser thicknesses of permselective coatings, in turn, normally allow higher permeation rates of permeants. While the invention is not bound by the following theory, it is believed that the higher deposition rate of a polysiloxane polymerizate in the presence of oxygen involves the formation of larger polymerizate nodules or protuberances around the edges of surface pores. These larger nodules or protuberances more easily fill in the surface openings on a porous substrate at lower deposited thicknesses.

The substrate upon which the plasma polymerizate coating is deposited is preferably a porous material, the substrate's function being to provide mechanical strength to the permselective barrier layer, as well as other handling characteristics. The substrate may be composed of polymeric, glass or ceramic components, or combinations of these components. Metallic components may also be used. But, in the case of an RF discharge plasma, metallic substrates would be normally unsuitable for plasma coating. Porosity may be inherent to the substrate by means of its formation, such as by agglomeration and sintering processes, or inherent in the substrate material by means of solvent casting and quenching processes, or induced in the substrate material by stretching processes, or otherwise obtained. The substrate may be a sheet, film, fiber, tube, flat plate, or even a wall member of a mechanical device. In that a primary intention for the composite membrane of this invention is its use as a gas separating membrane, a substrate which consists of a porous hollow fiber has been found to be particularly advantageous. Hollow fibers made of polymeric compositions such as polyolefins, substituted polyolefins, polysulfone or aromatic condensation polymers are well suited for this invention. Porous polypropylene hollow fibers have been found to be particularly advantageous as substrates in this invention. Such fibers are commercially available from at least two sources, these being Hoechst Celanese Corporation, maker of Celgard X20-240 and X20-400 hollow fibers, and Mitsubishi Rayon Company, maker of KPF 190M, 270B, 360A, 250M and 190G hollow fibers. These hollow fibers have pores that are generally elliptical in shape, due to the nature of their generation by drawing and stretching processes. The length of such pores may vary up to about 6000 angstroms, the width being at least 10 angstroms and varying up to 650 angstroms or more. Mitsubishi KPF 190M fibers have been found to be particularly preferred as substrates for use in this invention.

As to the plasma polymerization process, methods of inducing a glow discharge through a gaseous medium include use of microwave, audiofrequency and radiofrequency radiation. For applying coatings of polysiloxane plasma polymerizates on polymeric substrates such as polypropylene hollow fibers, radiofrequency (RF) methods are generally preferred. For continuous coating of the hollow fiber substrates according to this invention, a plasma is conveniently generated in a reaction tunnel or open ended chamber by means of a pair of RF capacitatively coupled electrodes mounted externally to the reaction tunnel or chamber. Of the pair of electrodes, one is normally a ground electrode. Optionally, RF glow discharge may be generated by a single electrode. Externally mounted electrodes are preferred and used in the invention as described herein. However, internally mounted electrodes may also be used. Externally mounted electrodes are preferred insofar as this avoids the problem of contamination of electrode surfaces with deposited polymerizates. External electrodes are typically mounted on RF-transparent members, such as quartz or high silica glass materials. Externally mounted electrodes are generally operated at higher discharge power than internally mounted electrodes, because of the intervening glass members, in order to activate and maintain a gas plasma state. Discharge power levels equal to, but not limited to, 50 to 200 watts are commonly used for this purpose, and are suitable for the practice of the invention. A broad range of radiofrequencies may be employed to generate a gas plasma, but because of radio interference potential, an assigned frequency of 13.56 MHz is commonly used.

FIG. 1 depicts an apparatus suitable for the continuous coating of a hollow fiber substrate by the method of this invention. This system, while representing only one of many such designs that may be employed, has been found to be particularly advantageous in the practice of the invention. In FIG. 1, a reaction tunnel 10 is connected at one end to a first vacuum chamber 11 having a base plate 12 and movable bell housing 13, and at its other end to a second vacuum chamber 14 having a base plate 15 and a movable bell housing 16. The bell housings 13, 16 seal to the base plates 12, 15 when the chambers are evacuated, but may otherwise be moved away for access to system components and workpieces in the chamber interiors. It is generally advantageous for system components located inside the vacuum chambers to be mounted to the base plates rather than the movable bell housings. The mounting may be made directly to the base plate or indirectly made by means of a frame or scaffold anchored to the base plate.

Provision is made for evacuating the system by means of vacuum ports 17, 18 located on base plates 12, 15 respectively. Vacuum port 18 is connected to a vacuum source (not shown) by means of a line that contains a butterfly valve 19 which is controlled by a pressure sensing monitor 20 so as to maintain system pressure at a level consistent with gas plasma treatment, i.e., normally in the range of 0.01 to 2 torr. The other vacuum port 17 is equipped with an on-off valve 21, which allows evacuation through both bell chambers during pump down. The plasma feed gases are introduced through one or more inlet ports 22.

Generally, in the practice of the invention, plasma feed gases are introduced into the first vacuum chamber 11, and flow through the reaction tunnel 10, residual gases being removed through the other vacuum chamber via its vacuum port. A glow discharge electrode 23 (shown by a dashed outline), that is externally mounted on a synthetic quartz plate 24 and is connected to an RF signal generator (not shown), excites the gases in the reaction tunnel 10 to a glow discharge plasma. A hollow fiber substrate 25 to be plasma coated is fed through the reaction tunnel 10 from one vacuum chamber to the other. A supply spool 26 containing a hollow fiber substrate 25 is located in the first vacuum chamber 11. The hollow fiber 25 is fed from the supply spool 26 and passes over a dual set of guides 27 located at the two ends of the reaction tunnel 10. The guides are positioned on shafts 28, upon which they rotate freely. The shafts 28 are suitably mounted such as by mountings 29 to base plates 12, 15 of the apparatus. These guides 28 serve to guide the fiber substrate 25 through the reaction tunnel 10 for multiple passes, until sufficient exposure to the plasma has occurred to provide a desired thickness of plasma polymerizate coating on the surface of the hollow fiber. Any number of such guides 28 may be employed, consistent with required coating time for the fiber substrate 25, with due regard also for the ability of the fiber substrate 25 to withstand tension forces as it is pulled through the network of guides 28. Tension on the moving hollow fiber substrate is preferably kept as low as possible to minimize any distortion of the original shape and porosity of the substrate, while avoiding wall contact. The multiple passes through the reaction tunnel 10 tend to enhance the probability of a uniform coating upon the full circumference of the fiber substrate. The hollow fiber substrate 25, after its has been coated with a polysiloxane polymerizate by passage through a plasma of a gaseous blend containing a fully alkylated disiloxane and oxygen in the reaction tunnel 10, is then wound up on a product spool 30 positioned in the other vacuum bell chamber 14.

The reaction tunnel 10 may be formed of any material with sufficient strength to withstand the pressure difference between the tunnel's interior and exterior, and with sufficient chemical and thermal resistance to withstand continuous exposure to a gas plasma contained therein. Presently, quartz and high silica glasses, or stainless steel frameworks with window mounts of quartz or high silica glasses have been found to be satisfactory. Optionally, a long tubular reaction tunnel may be employed, with a single pass of fiber substrate through it, assuming that the design and operation of a long tubular reaction tunnel ensures an adequately uniform deposit upon the fiber circumference. The latter design, with its long pathway, would tend to require a vertically aligned apparatus to avoid fiber sagging and wall contact. Multiple short passes through a short reaction tunnel can be accommodated easily in a horizontally aligned apparatus, as well as in a vertically aligned apparatus.

This system as illustrated in FIG. 1 can be readily reconfigured to the continuous treatment of a roll of flat film by provision of suitable supply spools, rollers, guides and take-up spools. Similarly, it could be readily adapted to simultaneously coat a plurality of fiber substrates.

Figure 2:
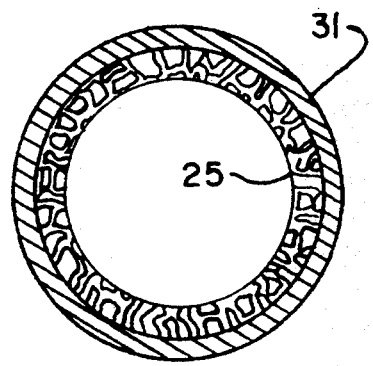
FIG. 2 is a cross-sectional of a porous hollow fiber coated with a plasma polymerizate.

FIG. 2 is a schematic drawing illustrating a hollow fiber permselective membrane whose cross-section consists of a microporous hollow fiber substrate 25, such as Mitsubishi KPF 190M, having a plasma-deposited coating 31 of a polysiloxane on its periphery. Dimensions in the figure are not drawn to scale. The thickness of the coating 31 will normally be less than 2 micrometers, and is preferably in the range of 0.02 to 1.0 micrometer for most membrane purposes, more preferably 0.1 to 0.5 micrometer thick.

Figure 3:
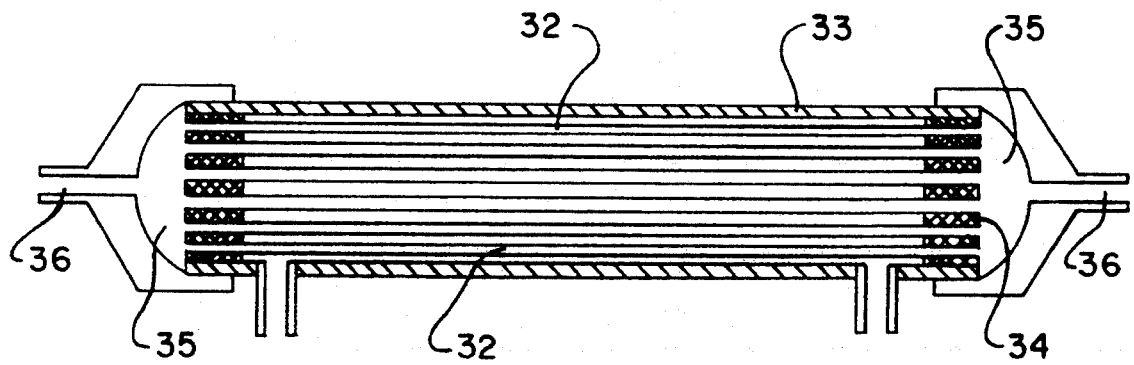
FIG. 3 is a cross-sectional view of a gas separation module.

FIG. 3 is a schematic drawing illustrating a use of a coated hollow fiber membrane in a gas separatory module. A bundle of hollow fiber composite membranes 32 are sealed into a casing 33 by means of potting compound 34 at each end of the bundle. The interior space in the fibers 32 are in open contact with a gas permeate collection chamber 35 at each end. Permeate ports 36 are provided for take-off of permeate gases. Inlet and outlet ports 37 on the shell side of the fiber bundle provide for flow-through of a feed gas from which permeate gases are selectively removed by the hollow fiber membrane 32. Other module design variations are also possible, as would be evident to one skilled in the art, including designs wherein only one end of a fiber bundle is open to permeate gas collection.

Figure 4A:
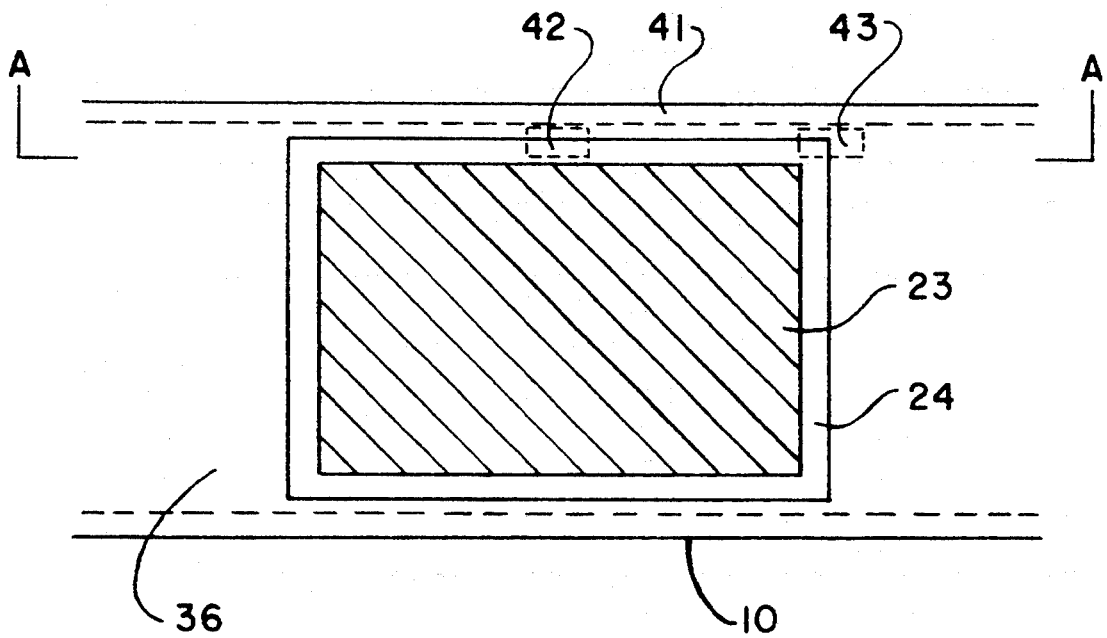
FIG. 4a is a top view of a gas plasma reaction tunnel showing placement positions of polymerizate deposition monitors.
Figure 4B:
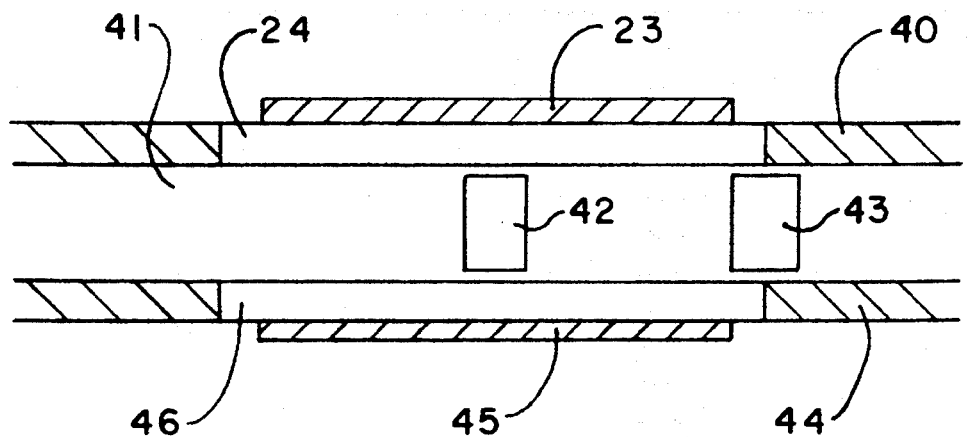
FIG. 4b is a cross-sectional view of the reaction tunnel of FIG. 4a showing placement positions of polymerizate deposition monitors.

FIG. 4a and 4b are schematic drawings illustrating sampling sites for determination of the rate of plasma polymerizate coating deposition. FIG. 4a shows a top view of a reaction tunnel 10 having an electrode 23 (one of a pair) mounted on a synthetic quartz plate 24 affixed to a top wall 40 of the tunnel. Interior to the tunnel on a side wall 41 are located a first sensor 42, designated in the experimental section to follow as in position "a", and a second sensor 43, designated as in position "b". FIG. 4b shows a cross-section of the reaction tunnel 10 at A—A, illustrating another view of the placement of the sensors 42, 43. Shown are a top wall 40, a bottom wall 44, and a side wall 41 of the reaction tunnel. Affixed to the top wall 40 is a glass plate 24 on which the top electrode 23, one of a pair, is mounted. The other electrode 45 is mounted on a second glass plate 46 affixed to the bottom wall 44. Sensors 42, 43 for measuring the rate of plasma polymerizate deposition are positioned against the side wall 41 as shown.

The experimental approaches and examples to follow are intended to further illustrate the invention, including some of the practical aspects of the method of the invention and articles of the invention derived thereby.

General Preparation

A gas plasma polymerization device was used that included a plasma reaction tunnel, a first vacuum chamber connected to one end of the tunnel and a second vacuum chamber connected to the other end of the tunnel. A microporous fiber to be coated with plasma polymerizate was fed from a spool located in the first vacuum chamber, passing through the reaction tunnel, and eventually being wound up onto a product spool located in the second vacuum chamber. Idler rollers were positioned at each end of the tunnel so that the fiber could be passed multiple times through the tunnel, going from idler to idler. In all of the following examples, the fiber was passed through the plasma polymerization zone a total of 17 times before being wound upon the product spool in the second vacuum chamber. Cross-sectional area of the tunnel was approximately 50 cm$^2$. The path length of the active zone of gas plasma polymerizate deposition in the tunnel was about 18 to 20 cm. The siloxane monomer consisted of fully alkylated disiloxane. Gaseous feed to the plasma was fed through an inlet port into the first vacuum chamber, and flowed toward a vacuum source in the second vacuum chamber. System pressure was controlled at preselected levels by means of a butterfly valve positioned in the vacuum port, its position continuously controlled by a pressure sensing monitor. Gas passing through the reaction tunnel was excited to a gas plasma state by a pair of radiofrequency (RF) electrodes operating at 13.58 MHz and 100 watts power. The RF electrodes were externally mounted, facing one another in a parallel arrangement, each electrode having an area of 35 square inches. Pulling speed of the fibers was 4.0 cm/sec, and total effective fiber residence time in the plasma zone immediately between the electrodes was about 75 seconds. Polypropylene microporous hollow fibers (Mitsubishi KPF190M), having an outer diameter of 245 micrometers and a wall thickness of 22 micrometers, were used as substrates for plasma polymerizate coating. Gas pressure within the plasma apparatus was maintained at about 75 mTorr unless otherwise indicated. Air was used as a source of oxygen.

Example 1

Microporous polypropylene hollow fiber was coated with a polysiloxane polymerizate by passage through a gas plasma containing hexamethyl disiloxane and oxygen according to the general procedure described above. Hexamethyl disiloxane vapor addition rate was 1.46 sccm (standard cubic centimeters per minute) and air addition rate was 2 sccm. A length of 432 meters of fiber was coated in a continuous operation. The resulting hollow fiber composite membrane was tested for gas permeation characteristics by evaluation in the form of a small 0.5-inch diameter module. A bundle of 20 lengths of coated fiber was inserted into a polycarbonate tube and potted at each end with a polyurethane potting resin. The ends of the potted bundle were shaved to open the lumens of the potted fibers. Effective membrane length of the bundle was 5.5 inch, and surface area of the membrane was 21.5 square centimeters. Three such modules were prepared. The modules were individually tested for permeation rates to selected gases by feeding the pure gases to the shell side of the fibers at a pressure of 25 psig and measuring the flux of gas permeate from the lumen side. Nitrogen permeability through the fibers in the modules was measured to be 1.24 to $1.56 \times 10^{-4} cm^3/cm^2$-sec-cmHg. Oxygen permeability through the fibers of the same modules was measured to be 2.19 to $2.87 \times 10^{-4} cm^3/cm^2$-sec-cmHg. Oxygen/nitrogen selectivity ratios were calculated for each module and found to be 1.77 to 1.88. Carbon dioxide permeation rate through the same modules was measured to be 9.66 to $10.6 \times 10^{-4} cm^3/cm^2$-sec-cmHg. Carbon dioxide/nitrogen selectivity ratios were 6.79 to 7.61.

Comparative Example A

The procedure of Example 1 was followed except that neither oxygen nor air was admitted to the gas plasma apparatus. Hexamethyl disiloxane vapor only was admitted at rate of 1.46 sccm. System pressure was maintained at 50 mTorr, and an RF plasma was maintained at a discharge power of 100 watts. Three test modules containing 20 fibers each were prepared from polypropylene fiber coated with the hexamethyl disiloxane plasma, and the modules were tested for gas permeability. The modules showed permeabilities of 2.55, 2.80 and $2.80 \times 10^{-2} cm^3/cm^2$-sec-cmHg for nitrogen, 2.20, 2.61 and $2.51 \times 10^{-2} cm^3/cm^2$-sec-cmHg for oxygen, and 2.55, 2.79 and $2.70 \times 10^{-2} cm^3/cm^2$-sec-cmHg for carbon dioxide. Oxygen/nitrogen selectivities were 0.86, 0.93 and 0.90; carbon dioxide/nitrogen selectivities were 1.00, 1.00 and 0.96. The data indicated leakage flow of test gases through pores in the polypropylene surface, such that porous flow was being observed. By way of comparison, a module made from uncoated fiber of the same substrate showed permeabilities for nitrogen, oxygen and carbon dioxide of 2.69, 2.53 and $2.55 \times 10^{-2} cm^3/cm^2$-sec-cmHg respectively. Hexamethyl disiloxane plasma polymerizate deposited on a polyethylene terephthalate film lining a wall of the plasma chamber displayed a self-adhering surface characteristic (i.e., blocking adhesion) upon contact with itself.

Comparative Example B

The procedure of Example 1 was followed except that neither oxygen nor air was admitted to the gas plasma apparatus, but nitrogen was admitted at a rate of 3.0 sccm. Hexamethyl disiloxane vapor was admitted at a rate of 1.46 sccm. System pressure was maintained at 75 mTorr. Three test modules containing 20 fibers each were prepared from polypropylene fiber coated with the hexamethyl disiloxane-nitrogen plasma, and the modules were tested for gas permeability. The modules showed permeabilities of 1.56, 2.41 and $2.63 \times 10^{-2} cm^3/cm^2$-sec-cmHg for nitrogen, 2.35, 2.20 and $2.34 \times 10^{-2} cm^3/cm^2$-sec-cmHg for oxygen, and 2.48, 2.42 and $2.47 \times 10^{-2} cm^3/cm^2$-sec-cmHg for carbon dioxide. Oxygen/nitrogen selectivities were 0.87, 0.91 and 0.89; carbon dioxide/nitrogen selectivities were 0.95, 1.00 and 0.94. The data indicated leakage flow of test gases through pores in the polypropylene surface, such that porous flow was being observed. Hexamethyl disiloxane plasma polymerizate deposited on a polyethylene terephthalate film lining a wall of the plasma chamber from the hexamethyl disiloxane-nitrogen plasma displayed a soft, tacky surface characteristic, and was self-adhering upon contact with itself.

Example 2

The procedure of Example 1 was followed except that the air addition rate was raised to 2.5 sccm. Hexamethyl disiloxane was used as the siloxane monomer. A total of 720 meters was coated. Three test modules were made therefrom. Nitrogen permeability of the three modules was observed to be 0.82 to $0.89 \times 10^{-4} cm^3/cm^2$-sec-cmHg. Similarly, oxygen permeability was 1.48 to $1.6 \times 10^{-4} cm^3/cm^2$-sec-cmHg, and carbon dioxide-permeability was 6.68 to $7.17 \times 10^{-4} cm^3/cm^2$-sec-cmHg. Calculated selectivities were 2.34 to 2.62 for oxygen/nitrogen and 10.54 to 11.75 for carbon dioxide/nitrogen.

Example 3

The procedure of Example 1 was followed except that the air addition rate was increased to 3 sccm. Hexamethyl disiloxane was used as the siloxane monomer. A total of 4.1 kilometers was coated. In module test data, nitrogen permeabilities of 0.56 to $0.68 \times 10^{-4} cm^3/cm^2$-sec-cmHg, oxygen permeabilities of 1.56 to $1.85 \times 10^{-4} cm^3/cm^2$-sec-cmHg, and carbon dioxide permeabilities of 7.18 to $8.46 \times 10^{-4} cm^3/cm^2$-sec-cmHg were observed. Selectivity ratios were 2.68 to 2.79 for oxygen/nitrogen and 12.44 to 12.82 for carbon dioxide/nitrogen.

Example 4

Deposition thickness monitors were used to measure the deposition rate of the plasma polymers under conditions of hexamethyl disiloxane plasma polymerization with and without the presence of added oxygen. Specific conditions for the set of plasma polymerizations are shown in Table 1. Inficon XTC (Leybold Inficon Inc.) sensors were used. Sensors were located at two positions as were shown in FIG. 4, the first position designated "a" being located on a vertical wall midway along the length of the plasma zone, the second position designated "b" being located on the same vertical wall at a entry point into the plasma zone. Because of inhomogeneities in the density of the plasma and direction of deposition (which are visually observable via light interference patterns in deposits on film liners placed along plasma chamber walls), sensor "a" was more indicative of the deposition rate on surfaces immediately adjacent to the ground electrode, and sensor "b" was more indicative of the deposition rate on surfaces immediately adjacent to the RF signal generating electrode. Deposition rates were measured under the same conditions as used in Comparative Example A, Comparative Example B and Example 3. Results are shown in Table 1. The results show that nitrogen caused an actual 7 to 11% decrease in polysiloxane plasma polymerizate deposition rate, whereas oxygen (admitted together with nitrogen, i.e., as air) resulted in a 29 to 246% increase in polysiloxane plasma polymerizate deposition rate.

TABLE 1

| Plasma Gas Flow Rate (sccm) | | | System Pressure (mTorr) | Sensor Position | Example Reference No. | Deposition Rate (A/min) |
| --- | --- | --- | --- | --- | --- | --- |
| HMDS | N2 | Air | | | | |
| 1.46 | — | — | 50 | a | Comp. Ex. A | 376 |
| 1.46 | — | — | 50 | b | Comp. Ex. A | 718 |
| 1.46 | 3.0 | — | 75 | a | Comp. EX. B | 334 |
| 1.46 | 3.0 | — | 75 | b | Comp. Ex. B | 670 |
| 1.46 | — | 3.0 | 75 | a | Ex. 3 | 486 |
| 1.46 | — | 3.0 | 75 | b | Ex. 3 | 2,484 |

Example 5

The procedure of Example 1 was followed except that hexamethyl disiloxane addition rate was increased to 1.94 sccm while holding air addition rate to 2 sccm. A total fiber length of about 1.25 kilometers was coated in a continuous operation. Five test modules were prepared in this case. Module permeability tests showed a nitrogen permeability of 3.99 to $5.19 \times 10^{-4}$ cm$^3$/cm$^2$-sec-cmHg, oxygen permeability of 6.01 to $7.34 \times 10^{-4}$ cm$^3$/cm$^2$-sec-cmHg, and carbon dioxide permeability of 21.14 to $23.52 \times 10^{-4}$ cm$^3$/cm$^2$-sec-cmHg. Selectivities were 1.3 to 1.63 for oxygen/nitrogen and 4.27 to 5.26 for carbon dioxide/nitrogen.

Example 6

The procedure of example 1 was followed except that air addition rate was increased to 3 sccm and hexamethyl disiloxane addition rate was increased to 1.75 sccm. A total of 3.36 kilometers was coated. Test data on three modules prepared from this fiber showed nitrogen permeability of 1.06 to $1.08 \times 10^{-4}$ cm$^3$/cm$^2$-sec-cmHg, oxygen permeability of 2.66 to $2.71 \times 10^{-4}$ cm$^3$/cm$^2$-sec-cmHg, and carbon dioxide permeability of 11.21 to $12.6 \times 10^{-4}$ cm$^3$/cm$^2$-sec-cmHg. Selectivities were 2.46 to 2.51 for oxygen/nitrogen and 10.38 to 11.89 for carbon dioxide/nitrogen.

Example 7

The procedure of example 2 was repeated, wherein addition rates were 1.45 for HMDS and 2.5 for air. A total of 2.45 kilometers of fiber was coated in a continuous manner. Data from three test modules made from the fiber showed nitrogen permeability to be 0.66 to $0.7 \times 10^{-4}$ cm$^3$/cm$^2$-sec-cmHg, oxygen permeability to be 1.85 to $1.88 \times 10^{-4}$ cm$^3$/cm$^2$-sec-cmHg, and carbon dioxide permeability to be 8.73 to $9.25 \times 10^{-4}$ cm$^3$/cm$^2$-sec-cmHg. Selectivity ratios were 2.64 to 2.85 for oxygen/nitrogen and 13.21 to 13.75 for carbon dioxide/nitrogen.

Example 8

The procedure of Example 1 was followed except that the air addition rate was raised to 2.7 sccm. Hexamethyl disiloxane was used as the siloxane monomer. A total of 1.01 kilometers of fiber was coated in a continuous manner. Data from three test modules made from the fiber showed nitrogen permeability to be 0.63 to $0.64 \times 10^{-4}$ cm$^3$/cm$^2$-sec-cmHg, oxygen permeability to be 1.69 to $1.76 \times 10^{-4}$ cm$^3$/cm$^2$-sec-cmHg, and carbon dioxide permeability to be 7.39 to $7.94 \times 10^{-4}$ cm$^3$/cm$^2$-sec-cmHg. Selectivity ratios were 2.68 to 2.79 for oxygen/nitrogen and 11.73 to 12.41 for carbon dioxide/nitrogen.

I claim:

1. A method of making a permselective composite membrane comprising: providing a gaseous blend comprising a fully alkylated disiloxane and added oxygen within a vacuum chamber, exciting the gaseous blend to a gas plasma by means of a glow discharge bringing a porous substrate into contact with the gas plasma, and depositing upon the porous substrate a plasma polymerizate comprising a polysiloxane, wherein the plasma polymerizate is deposited at a rate that is increased due to presence of the added oxygen in the gaseous blend, thereby generating a permselective composite membrane.

2. The method according to claim 1 wherein the porous substrate is in the form of a hollow fiber, film, sheet, tube, flat plate or wall member of a device.

3. The method according to claim 2 wherein the glow discharge is induced by means of a radiofrequency discharge.

4. The method according to claim 2 wherein the permselective composite membrane has an oxygen permeability of at least about $1.5 \times 10^{-4}$ cm$^3$/cm$^2$-sec-cmHg and an oxygen/nitrogen selectivity of greater than 2.3.

5. The method according to claim 4 wherein the fully alkylated disiloxane consists essentially of hexamethyl disiloxane.

6. The method according to claim 2 wherein the porous substrate is brought into contact a multiple number of times with the gas plasma.

7. A method of making a permselective composite membrane comprising: providing a gaseous blend comprising a disiloxane and added oxygen within a vacuum chamber, wherein the disiloxane has a formula $R_1R_2R_3Si—O—SiR_1R_2R_3$ where $R_1$, $R_2$, and $R_3$ are individually either methyl or ethyl groups, exciting the gaseous blend to a gas plasma by means of a glow discharge, bringing a porous substrate into contact with the gas plasma, and depositing upon the porous substrate a plasma polymerizate comprising a polysiloxane, wherein the plasma polymerizate is deposited at a rate that is increased due to presence of the added oxygen in the gaseous blend, thereby generating a permselective composite membrane.

8. The method according to claim 7 wherein the glow discharge is induced by means of a radiofrequency discharge.

9. The method according to claim 7 wherein the disiloxane is present in the gaseous blend at a partial pressure of 0.01 to 1.5 Torr.

10. The method according to claim 9 wherein oxygen is at a partial pressure ratio of 0.1 to 2.0 relative to the disiloxane.

11. The method according to claim 10 wherein oxygen is added to the gaseous blend in the form of air.

12. A membrane comprising: a porous substrate having a contiguous coating of a plasma polymerizate comprising a polysiloxane deposited thereon from a gas plasma comprising a fully alkylated disiloxane and added oxygen, wherein the plasma polymerizate has been deposited at a rate that is increased due to presence of the added oxygen in the gaseous blend, thereby generating a permselective composite membrane.

13. The membrane according to claim 12 wherein the fully alkylated disiloxane has a formula $R_1R_2R_3Si$-

—O—SiR$_1$R$_2$R$_3$ where R$_1$, R$_2$, and R$_3$ are individually either methyl or ethyl groups.

14. The membrane according to claim 13 wherein R$_1$, R$_2$, and R$_3$ are methyl groups.

15. The membrane according to claim 12 wherein the polysiloxane polymerizate coating has an oxygen permeability of at least about $1.5 \times 10^{-4}$ cm$^3$/cm$^2$-sec-cmHg and an oxygen/nitrogen selectivity ratio of greater than 2.3.

16. The membrane according to claim 15 wherein the porous substrate is a hollow fiber.

17. The membrane according to claim 16 wherein the hollow fiber consists essentially of polypropylene.

18. The membrane according to claim 12 wherein the porous substrate has pore sizes in the range of at least about 10 angstroms to at most about 6000 angstroms.

19. A module for separating gaseous mixtures comprising:

a shell means having spaced end portions and defining an elongated chamber therebetween, a plurality of permselective composite hollow fiber membranes having an oxygen permeability of at least about $1.5 \times 10^{-4}$ cm$^3$/cm$^2$-sec-cmHg and an oxygen/nitrogen selectivity ratio of greater than 2.3, the membranes comprising a porous hollow fiber substrate having a plasma polymerizate comprising a polysiloxane deposited on a surface thereof, the plasma polymerizate being deposited from a gas plasma formed by glow discharge through a gaseous blend comprising a fully alkylated disiloxane and added oxygen, the plasma polymerizate having been deposited at a rate that is increased due to presence of the added oxygen in the gaseous blend, wherein the membranes extend in a substantially parallel relationship within the elongated chamber, the membranes defining an intracapillary space within the hollow fibers and an extracapillary space outside the hollow fibers, fluid communication between the intracapillary and extracapillary spaces being only by means of permeation through the polysiloxane polymerizate coating, means for communicating a gaseous fluid with the extracapillary space, and means for removing a gaseous permeate from the intracapillary space.

20. The module according to claim 19 wherein the porous hollow fiber substrate has pore sizes in the range of at least about 10 angstroms to at most about 6000 angstroms.

21. The module according to claim 20 wherein the porous hollow fiber substrate consists essentially of polypropylene.

22. The module according to claim 21 wherein the fully alkylated disiloxane is hexamethyl disiloxane.

23. An article comprising a substrate having at least one surface, the surface being coated with a plasma polymerizate comprising a polysiloxane, the plasma polymerizate being deposited on the surface from a gas plasma formed from a gaseous blend comprising a vapor of a fully alkylated disiloxane and oxygen, the disiloxane vapor being present in the gaseous blend at a partial pressure of at least about 0.01 Torr to at least about 1.5 Torr, the oxygen being present at a partial pressure ratio of at least about 0.1 to at least about 2.0 relative to the disiloxane vapor, the plasma polymerizate being deposited at an increased rate due to presence of the oxygen in the gaseous blend.

24. The article according to claim 23 wherein the plasma polymerizate is deposited at a rate that is increased by at least about 29 percent to at least about 240 percent due to presence of the oxygen in the gaseous blend.

25. The article according to claim 23 wherein the plasma polymerizate is deposited at a rate of at least about 486 to at least about 2484 angstroms per minute.

26. The article according to claim 24 wherein the plasma polymerizate is deposited at a rate of at least about 486 to at least about 2484 angstroms per minute.

* * * * *